UNITED STATES PATENT OFFICE.

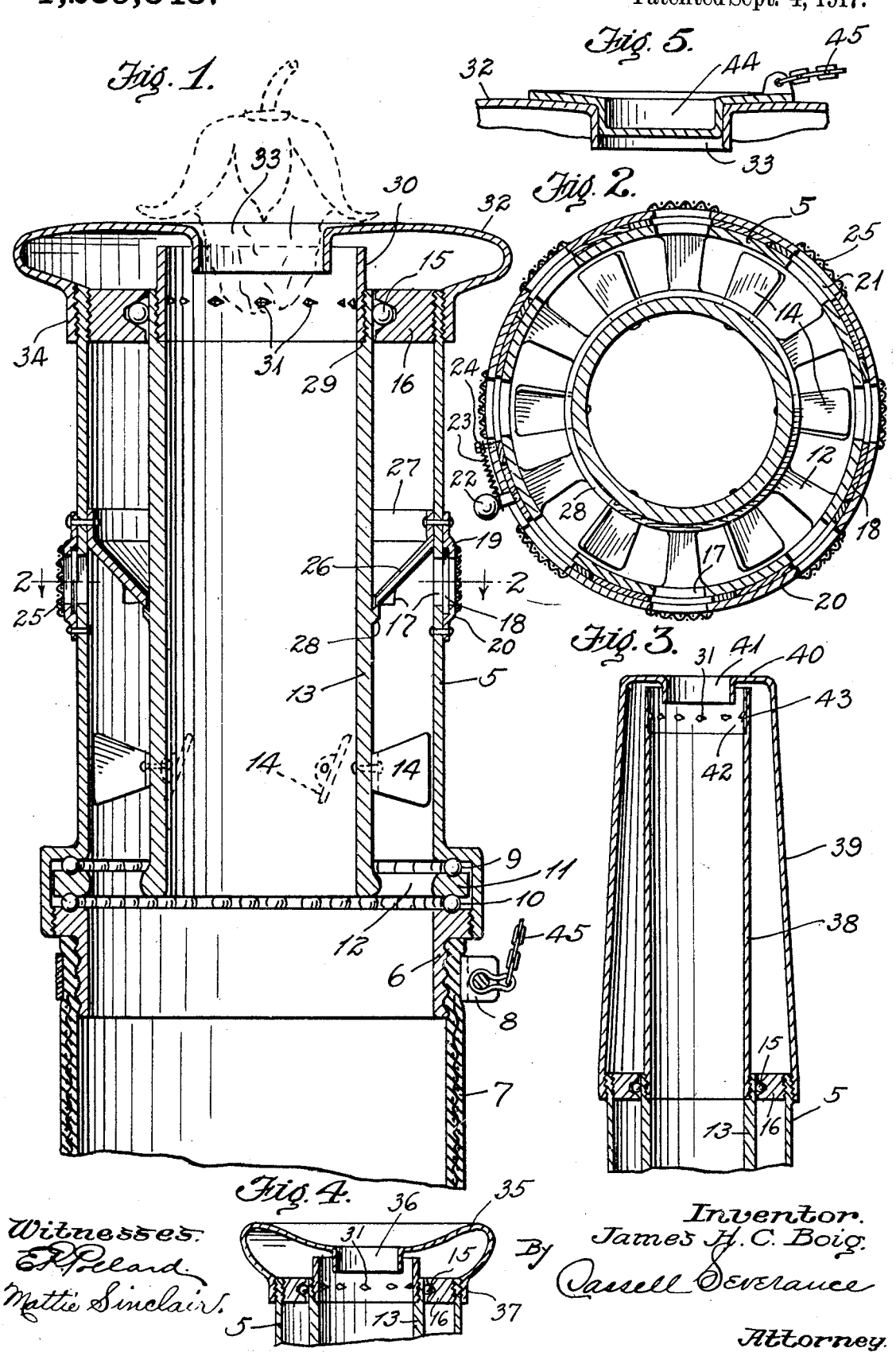

JAMES HENRY C. BOIG, OF PASADENA, CALIFORNIA.

COTTON-PICKER NOZZLE.

1,239,343.  Specification of Letters Patent.  Patented Sept. 4, 1917.

Application filed June 27, 1914. Serial No. 847,678.

*To all whom it may concern:*

Be it known that I, JAMES H. C. BOIG, a citizen of the United States, residing at Pasadena, in the county of Los Angeles and State of California, have invented certain new and useful Improvements in Cotton-Picker Nozzles, of which the following is a specification.

This invention relates to improvements in cotton picking devices, and particularly to pneumatic cotton pickers, where a picking nozzle is employed through which the air is drawn for turning cotton loosening means and drawing in the cotton, so that it may be collected in any desired manner.

The device of the present invention is an improvement upon the device forming the subject matter of my former application for a patent for cotton picker devices, filed April 28th, 1914, and bearing Ser. No. 834,919. The present device is however, more simple in structure and is provided with means for preventing the cotton bolls, from entering the picker nozzle with the cotton.

It is an object of the invention to provide a cotton picker device with a suction driven nozzle and to inclose the same with a supporting casing, a boll engaging cap or end piece being provided and formed with an inturned entrance portion, preferably of smaller diameter than the end of the picker nozzle so that the cotton drawn through said entrance portion will be well introduced into the nozzle proper before it expands or becomes separated under the action of the suction applied to the device.

It is also an object of the invention to provide a cotton picker device with a rotating picker nozzle open at its outer end to receive the cotton, and to provide the device with a boll-engaging cap or end portion, having an inwardly projecting flange surrounding an inlet opening for the cotton, said opening being of somewhat smaller size than the adjacent open end of the said rotating picker nozzle, whereby the cotton is projected well into the said nozzle by the flange of said cap, the surface of said cap around the opening thereof, engaging the cotton bolls and preventing them from entering the device with the cotton.

It is a further object of the invention to provide a cotton picker device with a suction driven picker nozzle, adapted to rotate within a suitable casing, said casing having air inlet openings and means for controlling the amount of air entering the same, and to provide fan vanes upon the picker nozzle adapted to be engaged by the air entering through said air inlet openings, the casing being provided with air directing means capable of preventing the air from turning toward the outer end of picker nozzle and causing it to move against the said vanes.

With these and other objects in view, the invention comprises certain other novel constructions, combinations and arrangements of parts as will be hereinafter more fully described and claimed.

In the accompanying drawing;

Figure 1, is a longitudinal central sectional view through a cotton picker nozzle, constructed in accordance with the present invention.

Fig. 2, is a transverse sectional view through the nozzle mechanism, taken upon the line 2—2 of Fig. 1.

Fig. 3, is a longitudinal central sectional view through a modified form of the invention and showing a tapering elongated form of nozzle.

Fig. 4, is a detail fragmentary sectional view through the outer end of another modified form of the device.

Fig. 5, is a fragmentary detail sectional view showing a plug for closing the opening in the cap portion of the device.

The cotton picker device of the present invention is similar to that described in my previous application for patent above referred to, but is provided with means for preventing the bolls of the cotton from entering the picker nozzle. The device is therefore provided with a cap or end piece having a restricted opening smaller than that of the rotating nozzle within, whereby the cotton which is drawn in by suction cannot fail to enter the said rotating nozzle and be engaged by the picker teeth therein, the said restricting opening however holding back and preventing the entrance of the bolls. The invention also contemplates the formation of the cap portion of the device in different ways to suit the kind of cotton that is to be picked and the conditions of the bolls of said cotton.

The details and features of the invention will now be more specifically described, reference being had to the accompanying drawing, in which 5 indicates the outer casing of the device, the lower end of which is enlarged and screwed upon a collar 6. Said collar is formed with a reduced portion adapted to enter the end of a suction pipe or tube 7. A clamping band 8 is usually employed for fastening the end of the tube 7 upon the collar 6. The suction tube 7 may be of any desired type but is usually flexible and extends to any usual or ordinary suction producing means, not shown in the drawing, so that air may be drawn through the cotton picker device which is carried by the end of said tube 7.

Within the enlarged portion at the inner end of the casing 5 are two sets of ball bearings 9 and 10 between which moves a ring 11. The said ring 11 has inwardly projecting arms 12 which carry a rotating tube or nozzle 13. The spaces left between the arms 12, and between the ring 11 and the inner end of the nozzle 13, are sufficiently large to permit of an ample flow of air between the casing and nozzle to operate the fan formed by blades or vanes 14 which are secured to the surface of said nozzle 13. A number of said vanes 14 are employed and set at suitable intervals around the nozzle, as clearly shown in Figs. 1 and 2 of the drawing. The said vanes are set at a suitable angle to obtain the desired rotation of the nozzle under the action of the suction.

The outer end of the nozzle 13 engages ball bearings at 15 carried by a ring 16 which is secured within the outer end of the casing 5. The said nozzle 13 being thus mounted on ball bearings at each end rotates easily under the actuation of the air driven vanes.

At a point intermediate the length of the casing 5, a series of air inlet openings 17 are arranged around the casing 5 and a damper slide 18 is movably mounted on the outer surface of said casing, in flanges 19 and 20, secured to said casing. The said slide 18 is provided with a series of openings 21, adapted to be brought into coincidence with the air inlet openings 17 of the casing 5. By moving said damper however the openings 17 can be partially or completely closed for controlling the inlet of air. The damper slide 18 is generally provided with an operating projection or knob 22 by which it may be moved, and since it is generally desired to have the openings 17 open, a spring 23 may be used to connect the knob 22 with a projection or screw stud 24 fastened to the casing 5. The knob 22 can of course be operated against the action of the spring 23 when it is desired to close the said openings 17. In order to prevent loose cotton or other foreign materials from entering the openings 17, wire gauze or other perforated material as 25 is placed over the said opening 17 as shown in the drawing.

In order to give a proper direction to the air entering through the openings 17, and also to prevent the air from escaping toward the outer end of the nozzle 13, an annular inclined baffle plate 26 is mounted between the casing and the said nozzle 13 as illustrated Fig. 1. The said baffle plate 26 is preferably provided with an attaching flange 27 which is riveted to the inner surface of the casing 5, while its inner edge approximates the surface of the rotating nozzle 13, quite closely, but not so as to touch said nozzle. In order to form an approximately air tight joint between the parts at this point, an annular outwardly projecting flange 28 is formed on the nozzle 13 and arranged to lap upon the adjacent edge of the baffle plate 26. This joint while preventing the air from turning and spreading in the wrong direction, does not interfere with the rotary action of the said nozzle 13.

The outer end of the nozzle 13 is preferably provided with an offset portion 29 which is interiorly screw threaded and adapted to receive the inner correspondingly threaded end of a picker ring 30. Said picker ring extends a suitable distance beyond the end of the nozzle 13 and is provided upon its inner surface with picker teeth or projections 31, adapted to catch upon the cotton and pull it inwardly as the nozzle revolves.

An important feature of the invention is the removable cap or end piece of the device. This piece is adapted to lead the cotton as it is pulled from the bolls, well into the rotating picker tube or nozzle 13. The cap is made in several forms to facilitate the gathering of the cotton under different conditions. As shown in Fig. 1, the cap as 32 may be formed with an outwardly rounded or convex surface and is provided with a central opening 33 surrounded by an inwardly extending flange which projects into the end of the picker ring 30, so as to properly direct the cotton into the picker nozzle. The opening 33 is preferably somewhat smaller than the diameter of the picker ring 30. The cap 32 is provided with an interiorly threaded attaching flange 34 by which it is removably secured to the outer end of the casing 5. As indicated in dotted lines in Fig. 1 the cotton boll is usually of larger size than the opening 33 in the cap so that it will be prevented from entering the nozzle with the cotton. This shaped cap is found especially well adapted for use with old cotton and with old bolls which have become brittle and therefore likely to break.

When working among young cotton plants when the bolls are green and tough the form of cap illustrated in Fig. 4 of the drawing is perhaps more effective. As shown in this figure the cap 35 is formed with a concave outer surface, a central flanged opening 36 being provided for properly entering the cotton in the picker nozzle. The cap 35 also has a threaded flange 37, by which it may be removably secured to the casing 5.

The shape of the picker ring and of the cap may be further altered without departing from the spirit of the invention. These parts being removable can be made interchangeable so that the picker rings and caps can be adapted to the different circumstances under which the picker device must be used. As shown in Fig. 3 the short picker ring 30 is sometimes replaced by a long picker ring as at 38, and an elongated cap 39 is then employed; the said cap being preferably tapered and made smaller at its outer end than at its inner end. The outer end of the cap 39 has a more contracted outer surface at 40 than the other forms of cap described, but is also provided with the central flange opening as at 41 for introducing the cotton into the end of the picker ring 38. This type of cap is especially well adapted to operate upon Egyptian and Durango cottons where the stalks become large and stiff. Such a nozzle is easily thrust among the branches and stalks of such kinds of cotton, in moving from boll to boll. The picker teeth may be secured directly to the picker ring 38 or may be carried by a smaller ring as 42 which is located in an offset or recessed portion formed in the outer end of the ring 38. This form of the device is not only well adapted for use in very bushy cotton and among stiff stalks and branches of Egyptian, Durango or other like cotton plants, but is useful in picking up loose cotton from the ground where it is desired to avoid taking up sand dirt or foreign materials. When used for this purpose it is not necessary to have picker teeth in the nozzle, and the ring 42 can be left out of the ring 38. It is also unnecessary when picking up loose cotton to rotate the nozzle 13 and the damper slide 18 may be closed upon the openings 17 so that the indrawn air will merely pass through the inside of the nozzle 13 for drawing in the cotton, without engaging the fan and rotating the nozzle, all within the control of the operator.

When using the device in the cotton field it is sometimes desired to lay the nozzle upon the ground temporarily and without stopping the suction fan or device. At such times a plug or stopper 44 is inserted in the opening of the cap as is shown in Fig. 5 of the drawing thus preventing the dirt or foreign materials from being drawn into the nozzle. The plug 44 may be connected by means of a chain or other flexible connecting means with the clamping band 8 or with any other portion of the mechanism so that the cap will not be lost when not in use and will always be at hand when wanted.

What is claimed is:

1. A cotton picker device comprising a rotary suction nozzle and means overhanging the open end of said nozzle, and concentrating the suction for insuring the strong pulling of the cotton from the boll into the nozzle.

2. A cotton picker device comprising a rotary picker nozzle having picker teeth therein, and a boll excluding member having a cotton guiding portion projecting into the said nozzle, the diameter of said nozzle being of larger diameter than the diameter of the said cotton guiding portion, whereby concentrated suction detaches the cotton from the boll.

3. A cotton picker device comprising a casing, a rotating nozzle mounted thereon, the said nozzle being opened at its outer end to receive the cotton, and a removable cap upon the said casing having a central inlet opening of less diameter than that of the nozzle, and having an inturned flange around the said opening, the flange extending toward the interior of the nozzle sufficiently to insure the entrance of the cotton inside the nozzle which is of larger diameter than said inturned flange.

4. A cotton picker device comprising a casing, a suction nozzle within the same through which the cotton is adapted to be drawn, the casing having an overhanging end portion secured thereon provided with a cotton inlet opening of smaller diameter than the body of nozzle, whereby bolls will be prevented from following the cotton into the nozzle, and the suction will be concentrated to detach the cotton from the boll.

5. A cotton picker device comprising a casing, a picker nozzle revolubly mounted therein, a removable picker ring carried by said nozzle and a removable cap carried by said casing and having a cotton introducing passage way for depositing cotton within said picker ring, the said picker ring and the said cap by reason of their removable character being replaceable with picker rings and caps of different shapes to accommodate the picker device to different kinds of cotton and to different circumstances affecting the picking of the cotton.

6. A cotton picker device comprising a casing having air inlet openings in its wall, a damper slide for controlling the entrance of air there through, a picker nozzle revolubly mounted within the casing and having fan vanes thereon adapted to be engaged by the air entering said openings for turning the nozzle, an air directing baffle member between the casing and said nozzle for directing the air against the vanes under the action of a suction and means for directing the cotton into the nozzle.

7. A cotton picker device comprising a casing having air inlet openings in its wall, whereby air may be drawn within the casing under a suction, a damper for controlling the air at said openings, a spring normally holding the damper so that said openings will be unobstructed, a picker nozzle revolubly mounted within the casing but spaced therefrom, vanes carried by said nozzle and arranged in the space between the same and the casing whereby the indrawn air will be caused to rotate the nozzle, the adjustment of the said damper controlling the speed with which the nozzle is rotated, and a cap for directing the cotton picked, within the said nozzle.

8. A cotton picker device comprising a suction rotated picker nozzle, a boll fending cap extending over the outer end of the nozzle, and having an opening of reduced size with respect to the diameter of the body of said nozzle, whereby all cotton which is drawn through the said opening in the cap will easily pass through the picker nozzle.

9. A cotton picker device comprising a revoluble picker tube, a casing inclosing the same, a cap member carried by the casing and covering the end of said tube, said cap member having an inlet passage for directing the cotton into the tube, and a plug adapted to close said passage for excluding dirt and foreign materials when the cotton is not being picked.

10. A cotton picker device comprising a rotary nozzle and a non-revoluble casing having a stationary guide means extending into the rotary nozzle forming a contracted inlet of less diameter than the main opening of said nozzle for leading the cotton within the same.

11. A cotton picker comprising an outer casing, an inner rotary nozzle, and a cap member fastened upon the said casing and projecting over the edges of the rotary nozzle and into the outlet of said nozzle, whereby a contracted inlet of less diameter than the body of said nozzle is afforded and the cotton is directed thereby to a point within the rotating nozzle and a space between the casing and the said rotary nozzle is covered.

In testimony whereof, I have hereunto set my hand, in presence of two witnesses.

J. HENRY C. BOIG.

Witnesses:
CASSELL SEVERANCE,
LILLIE VOLLMER.